H. P. NUSBAUM.
Feed Attachment for Guano Drill.
No. 205,671. Patented July 2, 1878.
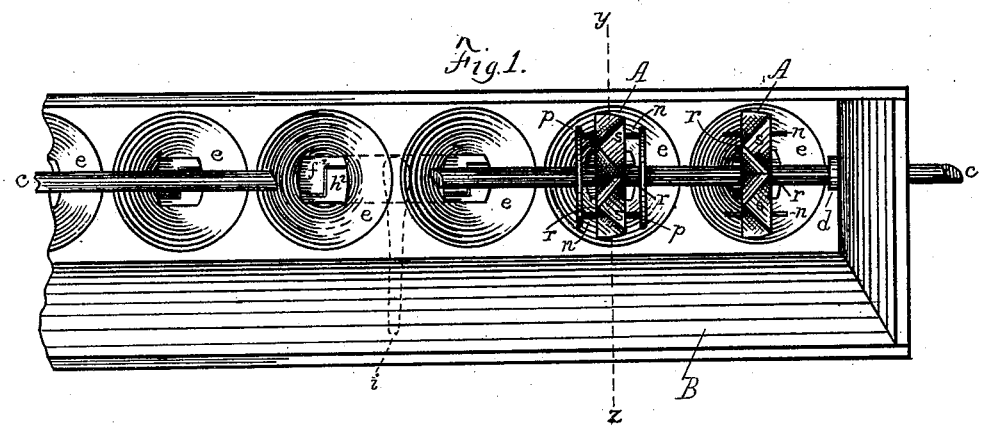
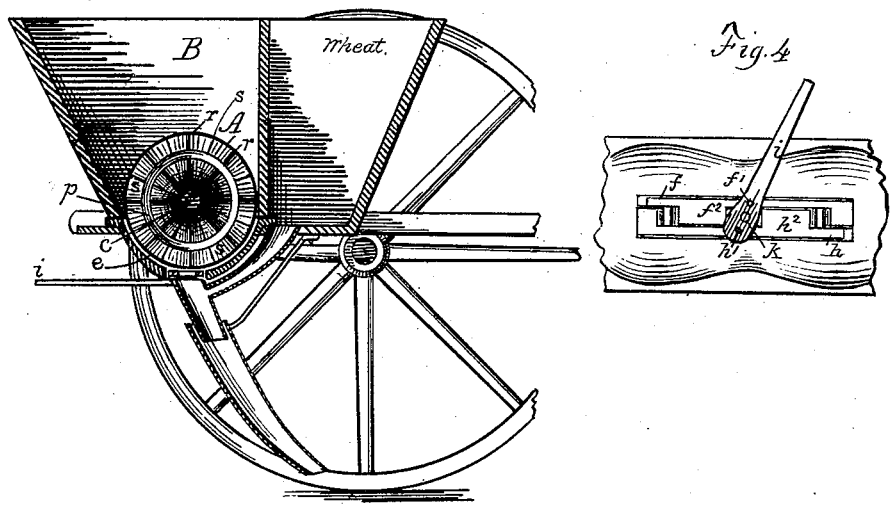
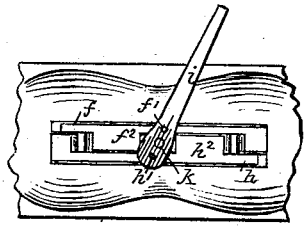
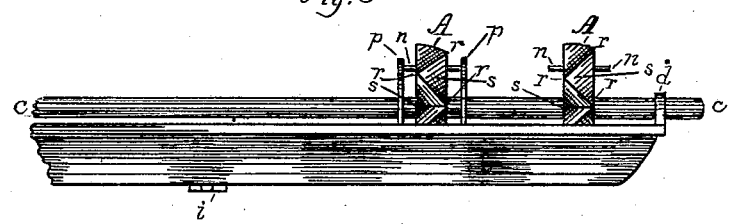
WITNESSES:
Charles E. Lewis.
A. E. Eader
INVENTOR:
Henry P. Nusbaum
By his Atty
Chas B. Mann

UNITED STATES PATENT OFFICE.

HENRY P. NUSBAUM, OF LIBERTYTOWN, MARYLAND.

IMPROVEMENT IN FEED ATTACHMENTS FOR GUANO-DRILLS.

Specification forming part of Letters Patent No. 205,671, dated July 2, 1878; application filed May 31, 1878.

*To all whom it may concern:*

Be it known that I, HENRY P. NUSBAUM, of Libertytown, in the county of Frederick and State of Maryland, have invented a new and useful Improvement in Feed Attachments for Guano-Drills, of which the following is a specification:

My invention relates to improvements in agitating or crushing wheels for guano-drills.

The object of my invention is to improve the feed apparatus of guano or fertilizer drills to insure a uniform feeding of the guano by agitating, crushing the lumps, and distributing it to the feed-aperture.

My invention will first be described in connection with the accompanying drawing, and then pointed out in claim.

Figure 1 is a plan view of the guano-box, showing my improvement. Fig. 2 is a vertical section of an elevation of a drill embodying my improvement through line $y$ $z$, Fig. 1. Fig. 3 is a rear view of the concave-shaped hoppers and agitating-wheel. Fig. 4 is a bottom-plan view of the hoppers and feed-slides.

My improvement is applicable to most any of the grain and guano drills used.

The wheels and frame-work of an ordinary drill are shown in Fig. 2, wherein A represents the feed-wheel located in the bottom of the guano-box B and secured on a horizontal transverse shaft, $c$, having its bearings $d$ in the ends of the box, as seen in Figs. 1 and 3.

The bottom of guano-box B consists of a series of concavities or saucer-shaped feed-hoppers, $e$, open in the bottom, in which are arranged the cut-off feed-slides $f$ $h$, which consist of two reciprocating bars, (seen in Fig. 4,) to the outer edges of which a lever, $i$, is pivoted at $f^1$ and $h^1$, respectively, and between which points the said lever is pivoted, as shown at $k$, to the lower side of box. The feed-slides are provided in the bottom of the concave feed-hoppers with projections $f^2$ $h^2$, which intermit and coincide with each other, constituting at one and same time the feed-aperture and cut-off for the guano. By this arrangement the aperture, whether partially or entirely open, is always in the center of the concave-shaped feed-hopper, and the aperture or slot opens in a direction transversely to the revolution of the wheel, from which results an advantage hereinafter explained.

The agitating-wheel A is made zigzag on its periphery, its sides presenting alternately angle-points $r$ and depressions $s$, and is provided with three short transverse pins, $n$, (see Fig. 1,) to the ends of which, on each side of the wheel, are attached the rings or rims $p$. (See Figs. 2 and 3.) This form of wheel, in connection with the concaved feed-hopper, is found most efficient as an agitator and crusher and at same time as a distributer over the feed-aperture.

By a movement of the lever $i$ the size of feed-aperture is regulated, and the construction of the feed-slides is such that the openings are always below the center of the wheel, whereby the zigzag perimeter of the wheel, beside agitating and crushing the fertilizer, serves to keep the aperture from choking by small lumps and in rapid succession cuts the flow of fertilizer off and lets it on.

The shaft $c$, upon which the wheels are secured, projects through the box, and may be driven by gear-wheels, or otherwise receive motion from the revolving axle.

Having described my invention, I claim—

The improved agitating and crushing wheel A, having a zigzag periphery, with the side angles $r$ and depressions $s$, and the transverse pins $n$, to which are attached the rims $p$, in combination with the concave-shaped feed-hopper $e$ and feed-aperture, as set forth.

In witness whereof I hereunto set my hand.

HENRY P. NUSBAUM.

Witnesses:
 JACOB N. PITTENGER,
 CHS. E. LEWIS.